US008990412B2

United States Patent
Ishida

(10) Patent No.: US 8,990,412 B2
(45) Date of Patent: Mar. 24, 2015

(54) SESSION SHARING SYSTEM, SESSION SHARING METHOD, SESSION SHARING PROGRAM, AND USER TERMINAL

(75) Inventor: Takeya Ishida, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 623 days.

(21) Appl. No.: 12/845,342

(22) Filed: Jul. 28, 2010

(65) Prior Publication Data

US 2011/0078319 A1    Mar. 31, 2011

(30) Foreign Application Priority Data

Sep. 25, 2009   (JP) ................. 2009-220790

(51) Int. Cl.
  *G06F 15/16*   (2006.01)
  *H04L 29/06*   (2006.01)
  *H04L 29/08*   (2006.01)

(52) U.S. Cl.
  CPC ........ *H04L 65/1063* (2013.01); *H04L 65/1006* (2013.01); *H04L 67/14* (2013.01); *H04L 67/148* (2013.01); *H04L 67/10* (2013.01)
  USPC ...................................................... 709/228

(58) Field of Classification Search
  CPC .................................................. H04L 67/148
  USPC ........................................................ 709/228
  See application file for complete search history.

(56) References Cited

U.S. PATENT DOCUMENTS

| 7,346,695 | B1 | 3/2008 | Masters |
| 2003/0055977 | A1 | 3/2003 | Miller |
| 2005/0210143 | A1* | 9/2005 | Wengrovitz .................. 709/228 |
| 2006/0069783 | A1 | 3/2006 | Aihara et al. |

(Continued)

FOREIGN PATENT DOCUMENTS

| EP | 1248439 A2 | 10/2002 |
| GB | 2384581 A | 7/2003 |
| JP | 2006-127470 A | 5/2006 |

(Continued)

OTHER PUBLICATIONS

Alapetite. Dynamic 2D-barcodes for multi-device Web session migration including mobile phones. Apr. 2009.*

(Continued)

*Primary Examiner* — Bryan Lee
(74) *Attorney, Agent, or Firm* — Rabin & Berdo, P.C.

(57) ABSTRACT

There is provided a session sharing system for sharing sessions in a system in which one or more application servers cooperate for plural applications including: a first function processor; a second function processor; and a session information cooperation unit for converting session information of a session established with an application server, which is acquired from the first function processor or the second function processor, into a predetermined format and giving the converted session information to the second function processor or the first function processor, wherein the second function processor or the first function processor transmits, to an application server, a request message including the converted session information received from the session information cooperation unit, and the application server associates the converted session information included in the request message with session information that is generated based on a current communication processing protocol.

6 Claims, 17 Drawing Sheets

(56) References Cited

U.S. PATENT DOCUMENTS

2007/0106670 A1* 5/2007 Yoakum et al. .................. 707/10
2010/0043065 A1* 2/2010 Bray et al. .................... 726/8

FOREIGN PATENT DOCUMENTS

JP        2009-176289 A    8/2009
WO       WO-03/105443 A1   12/2003

OTHER PUBLICATIONS

W. Munkongpitakkun. Enhanced Web Session Mobility based on SIP. Sep. 2007.*

J. Rosenberg et al., "SIP: Session Initiation Protocol", The Internet Engineering Task Force, RFC3261, Jun. 2002, http://www.ietf.org/rfc/rfc3261.txt.

* cited by examiner

FIG.7

- EXAMPLES OF APPLYING HTTP SESSION INFORMATION (Cookie) TO SIP MESSAGE (A) — EXAMPLE OF APPLYING AS To HEADER PARAMETER
   To: <sip:vxml@110.5.1.52;Cookie=ed29cbffea3527b1>

(B) — EXAMPLE OF APPLYING AS Contact HEADER PARAMETER
   Contact:"0095" <sip:110.5.1.71:5060;transport=udp;Cookie=ed29cbffea3527b1>

(C) — EXAMPLE OF APPLYING AS SIP EXTENSION HEADER
   X - Cookie:ed29cbffea3527b1>

FIG.10

- EXAMPLES OF APPLYING SIP SESSION INFORMATION (CALL-ID) TO HTTP REQUEST (A) — EXAMPLE OF APPLYING AS PARAMETER OF GET METHOD http://www.oki.com/?Call-ID=440ca9599ba757fbc9a5a0024728db0e@110.5.1.71

(B) — EXAMPLE OF APPLYING AS HTTP EXTENSION HEADER

X - Call - ID: 440ca9599ba757fbc9a5a0024728db0e@110.5.1.71

41 REQUEST MESSAGE DISTRIBUTING UNIT

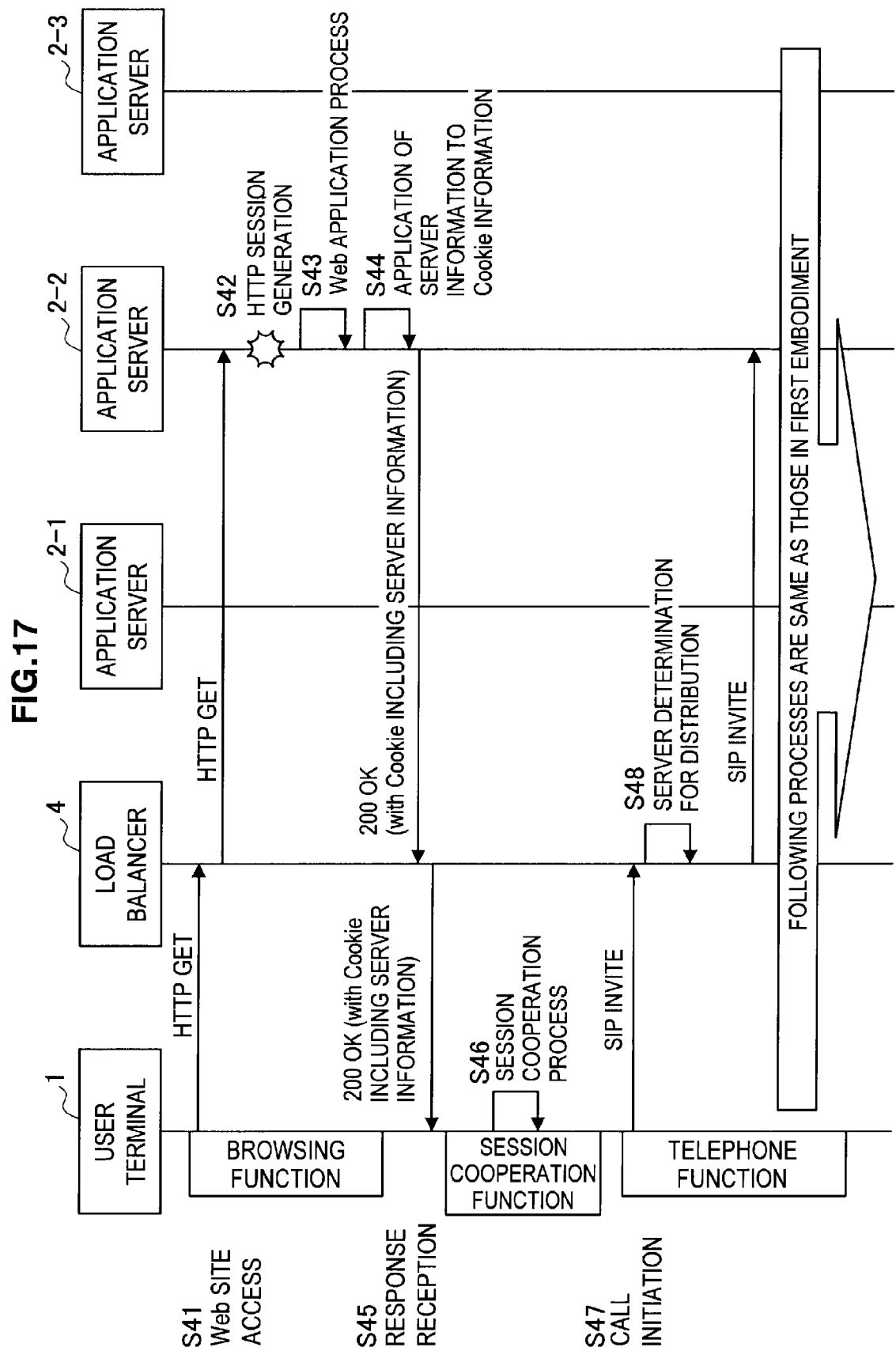

SESSION SHARING SYSTEM, SESSION SHARING METHOD, SESSION SHARING PROGRAM, AND USER TERMINAL

BACKGROUND OF THE INVENTION

1. Field of the Invention

The present invention relates to a session sharing system, a session sharing method, a session sharing program, and a user terminal, and is applicable to a system, a method, a program and a user terminal for sharing sessions related to a web service and a telephone function in an application that is built in a SIP-compliant application server and cooperates for a web service and a telephone function for example.

2. Description of the Related Art

For example, when an application server (hereinafter, referred to as a "server") provides an application that cooperates for a web service and a telephone function, it is important to specify a user to link user information for the web service and the telephone function.

FIG. 2 is an explanatory diagram of a session management of HTTP (HyperText Transfer Protocol) and SIP (Session Initiation Protocol) in a case where a server provides a cooperated application to three users A to C, for example. In FIG. 2, when the server generates HTTP session objects "1," "2" and "3" and SIP session objects "a," "b" and "c," it is important that the server that provides the cooperated application associates the HTTP session object "3" with SIP session object "b" as the session objects related to the "user A", for example.

In general, when a web service is provided, a method is employed in which a web server stores cookies onto a browser to maintain a user session, as a method for managing HTTP sessions, for example.

Further, when a voice communication is performed via a call connection using SIP, a method for storing a user session using a CALL-ID or the like according to a standardized technology specified in IETF RFC 3261 is employed as a method for managing SIP sessions, for example.

In a case of a scheme to initiate a call from a server (a third party call, for example) triggered by a web HTTP request for example, since the server controls the call using SIP based on the HTTP request, it is relatively easy to link the HTTP session and SIP session.

However, in a case of an application with a scheme to initiate a call from a user terminal as illustrated in FIG. 3, since the user terminal receives an HTTP request message and a SIP INVITE message independently, it is difficult to link the sessions in the server.

In such a case, the following method is employed as a method to link HTTP session and SIP session.

A first method is a method for embedding session-linking identification information to a response from a web application.

In this case, for example, a server 20 generates an identifier that uniquely identifies an HTTP session and adds the identifier to a response message in a web application processing shown in step S3 of FIG. 3. After that, a user terminal 10 adds the identifier to a parameter (an INVITE parameter, for example) when initiating a call and transmits the parameter to the server 20. Upon receiving the parameter, the server 20 links the corresponding HTTP session and SIP session based on the identifier in a SIP session generation process shown in step S6.

A second method is a method for registering a phone number of a user terminal to a web application in advance.

In this case, for example, the server 20 registers information that identifies a call such as a phone number of the user terminal 10 of a user, in the web application process shown in step S3. When generating a SIP session in step S6, the server 20 executes matching between a calling source number included in an INVITE message from the user terminal 10 with previously registered information to link the HTTP session and SIP session.

Here, the above methods explained with referring to the example of FIG. 3 are the cases of an application that initiates a call after a web access. In some applications, there is a different case in which a web access is executed after initiating a call and, in such a case, the second method is employed in which the server 20 registers a phone number of the user terminal 10 to a web application in advance.

SUMMARY OF THE INVENTION

However, the above described methods of related technology may cause the following issues.

According to the first method, since the process for generating a unique identifier of an HTTP session and the process for maintaining identifiers and the like are required in the server application, the increase of the number of processes of the application leads to a significant process load.

According to the second method, since it is required to register information such as a phone number or the like of the user in advance, users need to operate extra processes. Further, since the registration of the user information is manually performed, a user strain of operation increases and the accuracy of the information registration is not ensured.

In light of the foregoing, it is desirable to provide a novel and improved session sharing system, session sharing method, session sharing program and user terminal that are capable of reducing the load of application processing in a server and sharing necessary HTTP session and SIP session easily and surely to provide a cooperated application.

According to an aspect of the present invention, there is provided a session sharing system for sharing sessions in a system in which one or more application servers cooperate for plural applications including: a first function processor for receiving a first application service from an application server by a first communication processing protocol; a second function processor for receiving a second application from an application server by a second communication processing protocol; and a session information cooperation unit for converting session information of a session established with an application server, which is acquired from the first function processor or the second function processor, into a predetermined format and giving the converted session information to the second function processor or the first function processor, wherein the second function processor or the first function processor transmits, to an application server, a request message including the converted session information received from the session information cooperation unit, and the application server associates the converted session information included in the request message with session information that is generated based on a current communication processing protocol.

According to another aspect of the present invention, there is provided a session sharing method for sharing sessions in a system in which one or more application servers cooperate for plural applications including the steps of: receiving a first application service from an application server by a first communication processing protocol, by a first function processor; receiving a second application from an application server by a second communication processing protocol, by a second function processor; converting session information of a session established with an application server, that is acquired from the first function processor or the second function processor, into a predetermined format and giving the converted session information to the second function processor or the first function processor, by a session information cooperation unit; transmitting a request message including the converted session information from the session information cooperation unit to an application server, by the second function processor or the first function processor; and associating the converted session information included in the request message with session information generated by a current communication processing protocol, by the application server.

According to another aspect of the present invention, there is provided a session sharing program for a user terminal in a session sharing system in which one or more application servers share sessions and cooperate for plural applications, the program causing the user terminal to function as: a first function processor for receiving a first application service from an application server by a first communication processing protocol; a second function processor for receiving a second application from an application server by a second communication processing protocol; and a session information cooperation unit for converting session information of a session established with an application server, which is acquired from the first function processor or the second function processor, into a predetermined format and giving the converted session information to the second function processor or the first function processor, wherein the second function processor or the first function processor transmits a request message including the converted session information received from the session information cooperation unit to an application server.

According to another aspect of the present invention, there is provided a user terminal configured in a session sharing system in which one or more application servers share sessions and cooperate for plural applications, the user terminal including: a first function processor for receiving a first application service from an application server by a first communication processing protocol; a second function processor for receiving a second application from an application server by a second communication processing protocol; and a session information cooperation unit for converting session information of a session established with an application server, that is acquired from the first function processor or the second function processor, into a predetermined format and giving the converted session information to the second function processor or the first function processor, wherein the second function processor or the first function processor transmits, to an application server, a request message including the converted session information received from the session information cooperation unit.

According to the present invention, a load of application processing in a server can be reduced, and necessary HTTP session and SIP session can be easily and surely shared to provide a cooperated application.

BRIEF DESCRIPTION OF THE DRAWINGS

FIG. 7 is an explanatory diagram of a specific example of applying HTTP session information to a SIP message according to the first embodiment;
FIG. 10 is an explanatory diagram of a specific example of applying SIP session information to an HTTP message according to the first embodiment;
FIG. 17 is a sequence diagram of a session cooperation process in a case of initiating a call after a web access according to the third embodiment;

DETAILED DESCRIPTION OF THE EMBODIMENT(S)

Figure 1:
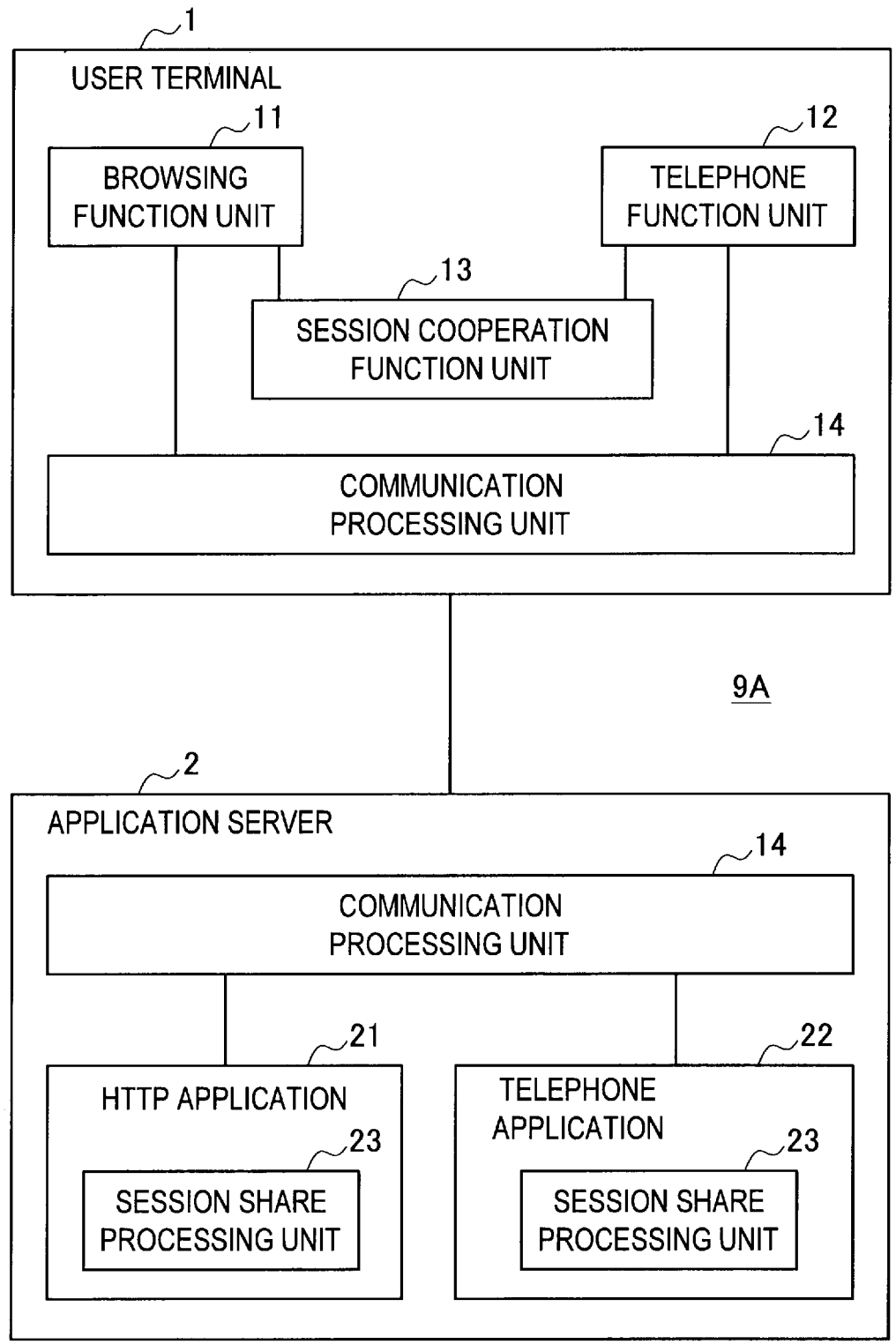
FIG. 1 is a configuration diagram illustrating a session sharing system of a first embodiment.
Figure 2:
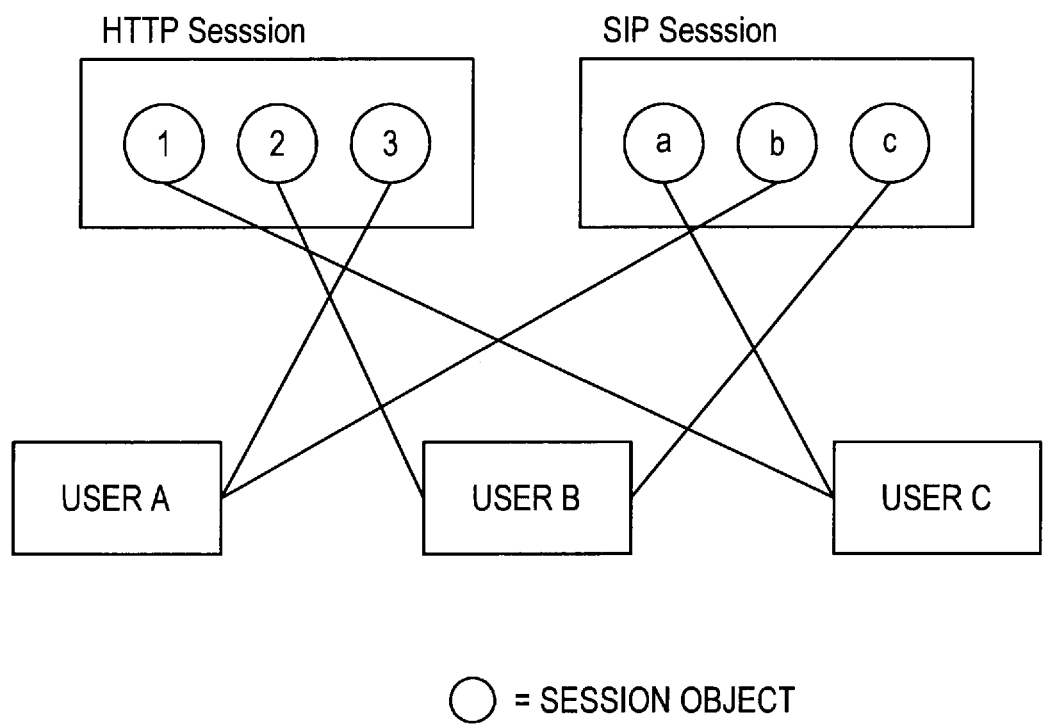
FIG. 2 is an explanatory diagram of a linking of HTTP session and SIP session in related art.
Figure 3:
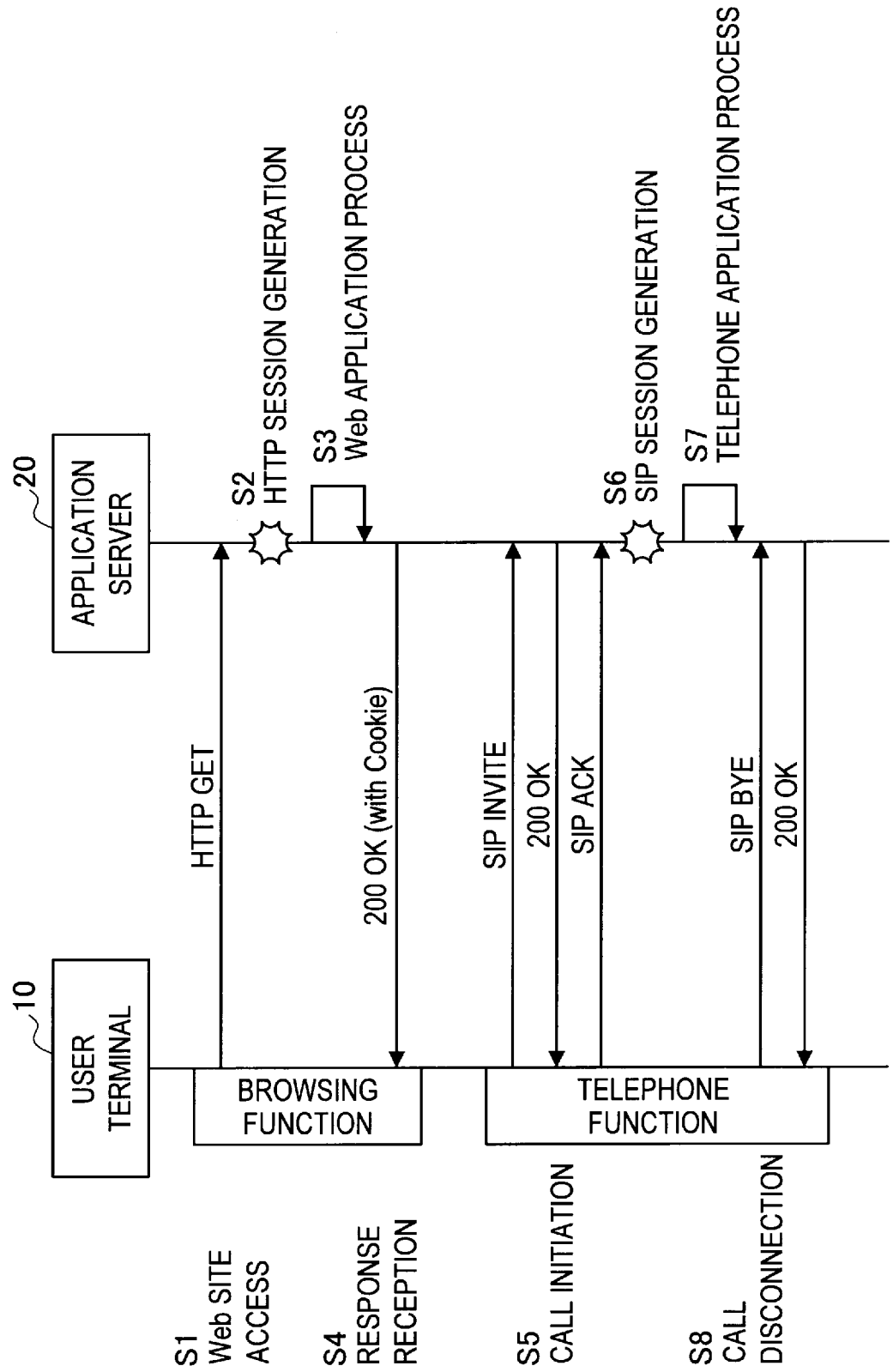
FIG. 3 is a sequence diagram of a web/telephone cooperated application in related art.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(A) First Embodiment

A session sharing system, a session sharing method, a session sharing program and a user terminal according to a first embodiment of the present invention will be explained with reference to the drawings.

The first embodiment will be exemplified by an embodiment in which the present invention is applied to a method for sharing HTTP session and SIP session by an application server in a cooperated application system in which an application server provides an application for coordinating a web service and a telephone function.

(A-1) Configuration of First Embodiment

FIG. 1 is a configuration diagram illustrating a main configuration of the session sharing system according to the first embodiment. FIG. 1 illustrates a session sharing system 9A according to the first embodiment in which a user terminal 1 and an application server 2 are connected via a network.

In the configuration of an actual system, there may be provided a device such as an SIP/HTTP proxy server and a load balancer between the user terminal 1 and the application server 2 for example; however, those devices are omitted to simplify the explanation of the characteristics of the invention.

The user terminal 1 is a terminal of a user who receives a provided cooperated application. The user terminal 1 is a portable terminal device such as a personal computer, a mobile phone having a communication function, a personal digital assistant (PDA) or a game terminal, for example. Further, an internal configuration of the user terminal 1 includes at least a browsing function unit 11, a telephone function unit 12, a session cooperation function unit 13 and a communication processing unit 14, as illustrated in FIG. 1.

The browsing function unit 11 is a processing unit that uses HTTP as a communication protocol for example to browse web data or information (HTML files, image files or music files, for example) which is provided by the application server 2. A general browser may be used as the browsing function unit 11 and the browsing function unit 11 receives cookie information from the application server 2 and maintains it to manage HTTP sessions.

Further, to access to the web after initiating a call, the browsing function unit 11 receives, from the later described session cooperation function unit 13, session information (CALL-ID in an HTTP parameter format or the like) that specifies a SIP session of the telephone function, applies the session information to an HTTP message, and transmits the HTTP message to the application server 2 to access the web.

The telephone function unit 12 is a processing unit that performs voice communication using SIP, for example. The telephone function unit 12 establishes a session by transmitting and receiving SIP messages to and from the application server 2 according to a standardized technology of RFC 3261 for example, and executes voice communication.

When initiating a call after a web access, the telephone function unit 12 receives, from the later described session cooperation function unit 13, session information (cookie information in a SIP parameter format or the like) which specifies an HTTP session related to the web access, applies the session information to a SIP message, and transmits the SIP message to the application server 2.

The session cooperation function unit 13 converts the session information acquired from the browsing function unit 11 or telephone function unit 12 into a predetermined format and gives the converted session information to the telephone function unit 12 or browsing function unit 11.

Figure 4:
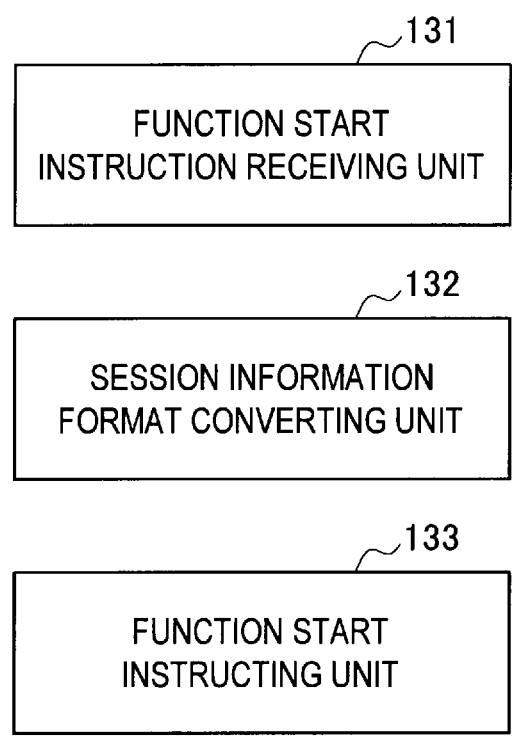
FIG. 4 is a block diagram illustrating a functional configuration of a session cooperation function unit of the first embodiment.

FIG. 4 is a block diagram illustrating a functional configuration of the session cooperation function unit 13. As illustrated in FIG. 4, the session cooperation function unit 13 includes at least a function start instruction receiving unit 131, a session information format converting unit 132 and a function start instructing unit 133.

The function start instruction receiving unit 131 receives a function start instruction related to a newly starting functional operation from one of the browsing function unit 11 or telephone function unit 12 that is currently operating with the application server 2.

The session information format converting unit 132 converts session information included in the function start instruction into a parameter format of the communication protocol used in the newly starting communication.

For example, when initiating a call after a web access, the session information format converting unit 132 receives a call initiation instruction from the browsing function unit 11, converts the session information that specifies an HTTP session into a SIP parameter format, and gives the converted session information to the telephone function unit 12.

Further, for example, when a web access is executed after initiating a call, the session information format converting unit 132 receives a web access instruction from the telephone function unit 12, converts the session information that specifies a SIP session into an HTTP parameter format and gives the converted session information to the browsing function unit 11.

Here, the session information that specifies a SIP session may be information according to an existing technology and a CALL-ID or the like can be used, for example. Further, the session information that specifies an HTTP session may be information according to an existing technology and cookie information from the application server 2 can be used, for example.

For example, when HTTP session information is converted into a SIP parameter format, the session cooperation function unit 13 acquires cookie information which is used by the browsing function unit 11 during a web access and converts the cookie information into a SIP parameter format.

Further, for example, when SIP session information is converted into an HTTP parameter format, the session cooperation function unit 13 converts a CALL-ID acquired by the telephone function unit 12 into an HTTP GET parameter, which is an HTTP message.

As described above, since the conversion of HTTP or SIP session information is executed in the user terminal 1, the load of a session management process in the application processing by the server 2 is reduced and sessions can be shared by the server 2.

The function start instructing unit 133 provides a function start instruction including the session information converted by the session information format converting unit 132 to one of the telephone function unit 12 and browsing function unit 11 that is going to start the new communication.

The communication processing unit 14 is a communication processing unit for transmitting and receiving information via a communication network.

The application server 2 provides a user with an application that has coordinating plural functions. As illustrated in FIG. 1, the application server 2 includes an HTTP application 21 for providing a web application using HTTP and a telephone application 22 for providing a telephone function using SIP.

The HTTP application 21 executes a specific web application program. The HTTP application 21 establishes a session with the user terminal 1 in a specific application processing, generates cookie information for example, and transmits the cookie information or the like to the user terminal 1. Further, the HTTP application 21 executes a session management in which session information and application references are associated with each other, for example.

Upon receiving a call connection request message from the user terminal 1, the telephone application 22 executes an application for controlling calls between the user terminal 1 and a communication destination. The telephone application 22 generates a CALL-ID or the like according to the standardized technology of RFC 3261 for example, transmits and receives SIP messages including the CALL-ID or the like, and manages the call condition based on the CALL-ID or the like.

Further, the HTTP application 21 and telephone application 22 include a session share processing unit 23.

The session share processing unit 23 associates the SIP session information and HTTP session information to link the HTTP session and SIP session.

(A-2) Operation of First Embodiment

Next, an operation of a session sharing method of the first embodiment will be explained with reference to the drawings.

The session sharing process of the first embodiment can be applied regardless of the order of operations of a web access and a telephone function.

Hereinafter, it is separately described a case in which the user terminal 1 initiates a call after a web access and a case in which the user terminal 1 executes a web access after initiating a call.

(A-1-1) Initiation of a Call after Web Access

Figure 5:
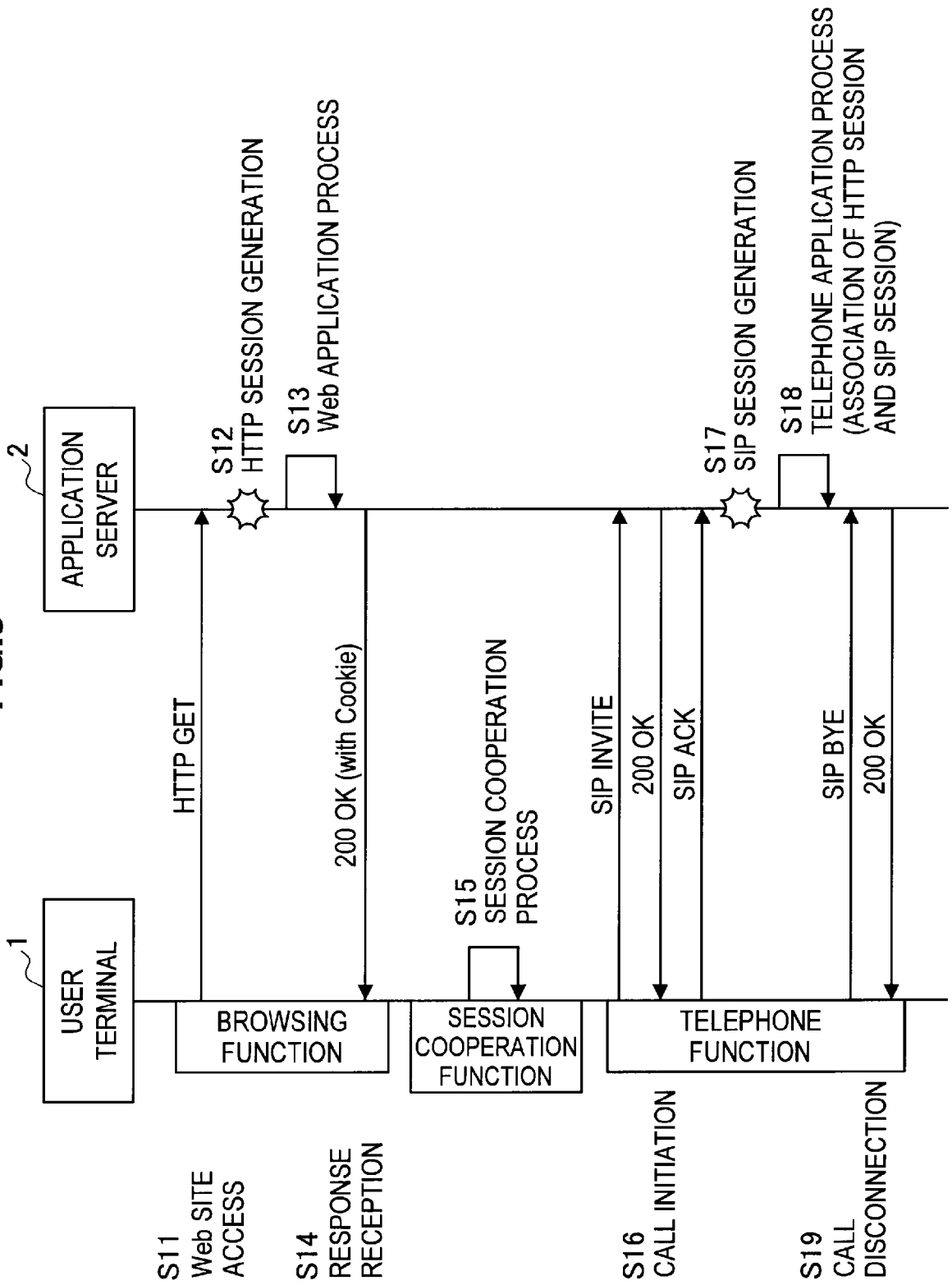
FIG. 5 is a sequence diagram of a session cooperation process in a case of initiating a call after a web access according to the first embodiment.
Figure 6:
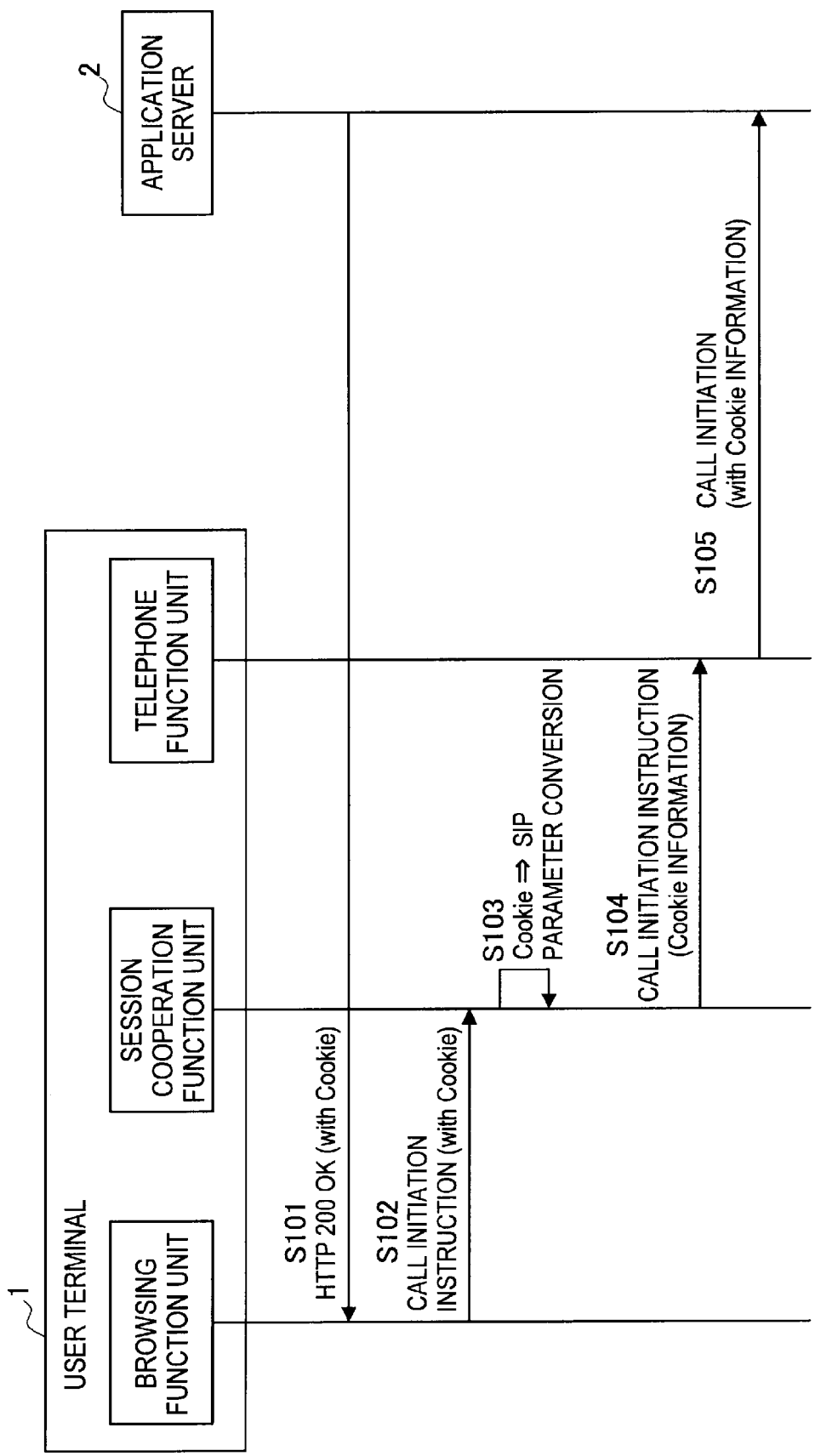
FIG. 6 is a sequence diagram in a user terminal when initiating a call after a web access according to the first embodiment.

FIG. 5 is a sequence diagram of a session cooperation process in a case in which a call is initiated after a web access. FIG. 6 is a sequence diagram of a session cooperation process in the user terminal 1.

Firstly, to access a predetermined web site, in the user terminal 1, the browsing function unit 11 transmits, to the application server 2, an HTTP GET that requests an access to the website (step S11).

Upon receiving the HTTP GET, the application server 2 generates an HTTP session (cookie information) (step S12), and the HTTP application 21 executes a web application process and returns a response message (200OK) including the cookie information to the user terminal 1 (steps S13 and S14).

In the user terminal 1, the browsing function unit 11 displays web data of the application server 2 so that the web service from the application server 2 can be received.

After that, when the user terminal 1 handles the cooperated application of the telephone function that cooperates with the web service, the session cooperation function unit 13 executes a process for converting the session information related to the web access into a SIP parameter format (step S15).

In this case, as illustrated in FIG. 6, when the browsing function unit 11 receives an HTTP 200OK including cookie information from the application server 2 (step S101), the browsing function unit 11 provides a call initiation instruction to the session cooperation function unit 13 (step S102).

The call initiation instruction from the browsing function unit 11 includes cookie information and the session cooperation function unit 13 converts the cookie information into a SIP parameter format (step S103) and gives the call initiation instruction including the cookie information to the telephone function unit 12 (step S104).

The telephone function unit 12 applies the cookie information to header information of the SIP INVITE message and transmits the SIP INVITE message to the application server 2 (step S105, and step S16 in FIG. 5).

A method for applying cookie information to a SIP message will be explained. For example, the telephone function unit 12 can apply cookie information as a TO header parameter or a Contact header parameter of a SIP INVITE message.

FIG. 7 shows a detailed example. For example, in the example of FIG. 7, it is assumed that the cookie information is "ed29cdffea3527b1."

For example, when cookie information is applied to a TO header, as shown in (A) of FIG. 7, the information is converted to
"To:<sip:vxml@110.5.1.52;Cookie=ed29cdffea3527b1>" before applied. Further, for example, when cookie information is applied to a Contact header, as shown in (B) of FIG. 7, the information is converted to
"Contact:"0095"<sip:110.5.1.71:5060;Transport=udp; Cookie=ed29cdffea3527b1>" before applied. Furthermore, when cookie information is applied as a SIP extension header, as shown in (C) of FIG. 7, the information is converted to "X-Cookie:ed29cdffea3527b1" before applied.

Further, when the session cooperation function unit 13 and telephone function unit 12 are cooperated more closely to each other, HTTP session information may be included in a tag value of a From header or a CALL-ID when a call is initiated. When this method is used, an extra parameter of a SIP header is not required, a compatibility with a SIP network will be improved. It can be prevented that an original parameter does not appropriate to the specification of a SIP network or that a parameter is automatically deleted by an intermediate node.

In the application server 2, upon receiving a SIP INVITE message, the telephone application 22 is activated, generates SIP session information (a CALL-ID, for example) (step S17) and controls a call between a calling source (the user terminal 1) and a calling destination included in the SIP INVITE message (step S18).

In this case, the telephone application 22 of the application server 2 extracts cookie information included in the SIP INVITE message, associates the currently generated CALL-ID with the cookie information, and links with the HTTP session based on the cookie information.

(A-1-2) Web Access after Initiating Call

Figure 8:
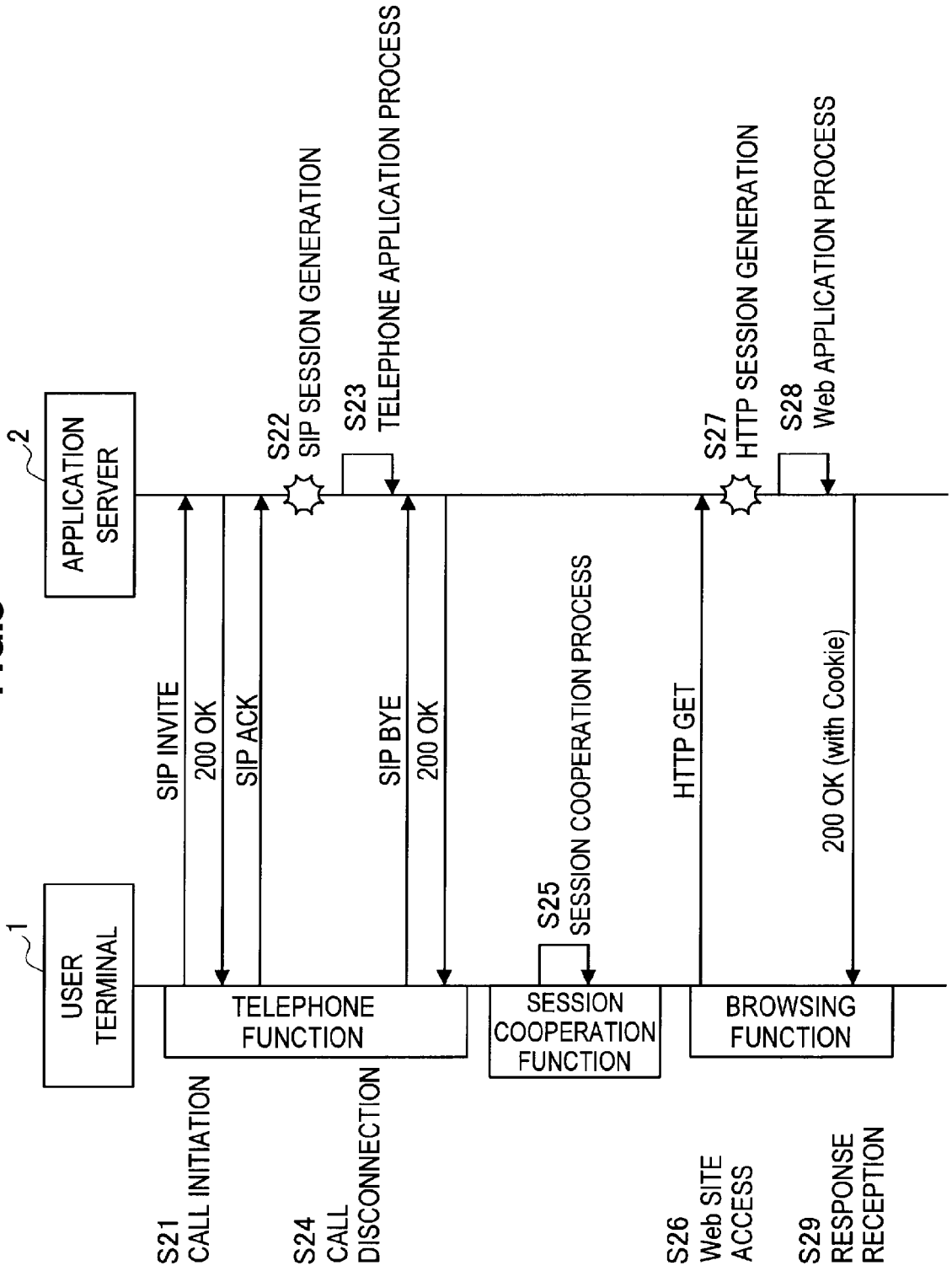
FIG. 8 is a sequence diagram illustrating a session cooperation process in a case of executing a web access after initiating a call according to the first embodiment.
Figure 9:
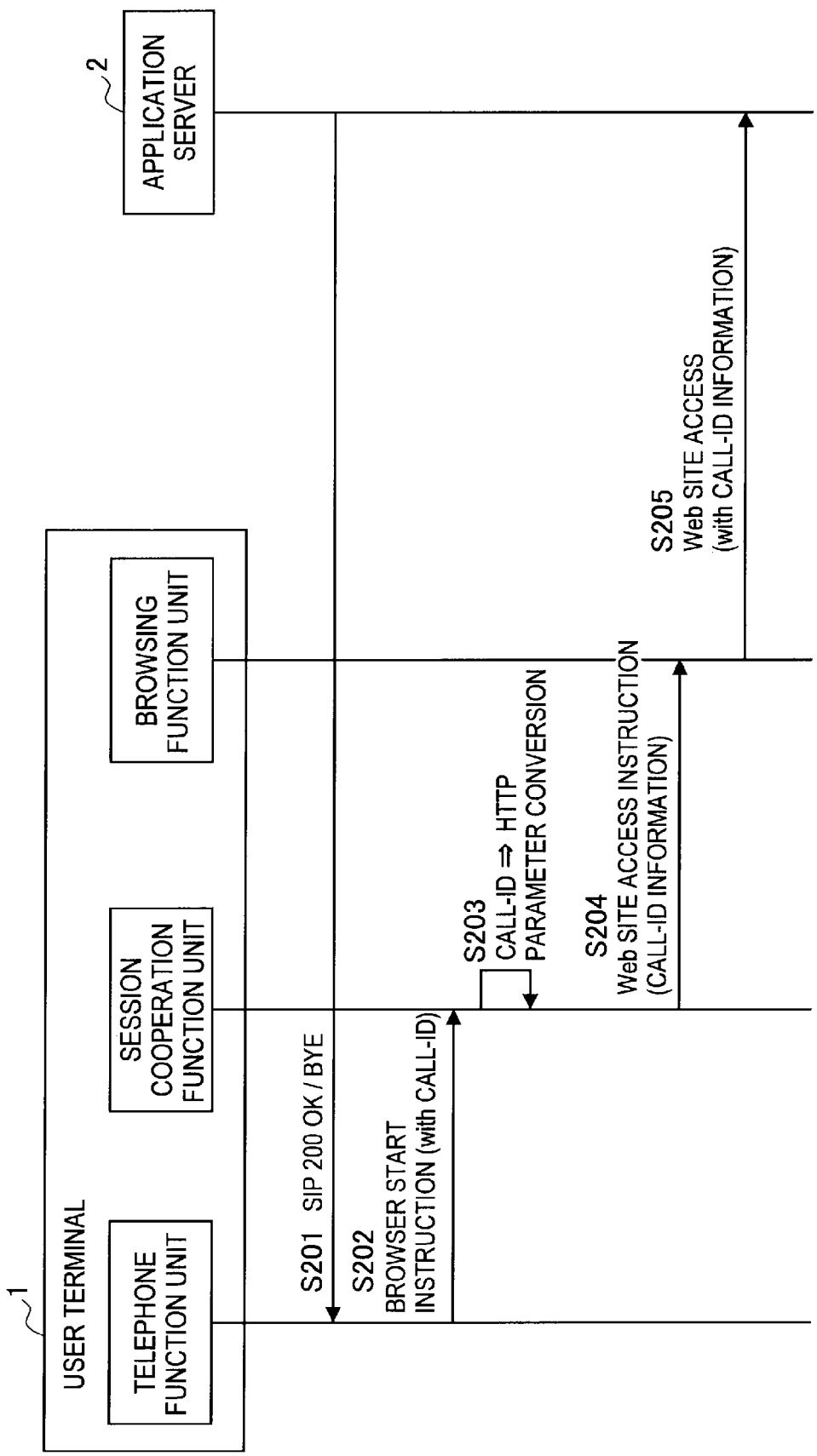
FIG. 9 is a sequence diagram in the user terminal when executing a web access after initiating a call according to the first embodiment.

FIG. 8 is a sequence diagram of a session cooperation process when a web access is executed after initiating a call. FIG. 9 is a sequence diagram of a session cooperation process in the user terminal 1.

Firstly, to initiate a call, in the user terminal 1, the telephone function unit 12 transmits a SIP INVITE message to the application server 2 (step S21).

Upon receiving the SIP INVITE message, the application server 2 generates a CALL-ID as SIP session information (step S22), executes a call control with a calling destination included in the SIP INVITE, and executes telephone application processing (step S23).

To execute a web access cooperated with the telephone function, in the user terminal 1, the telephone function unit 12 disconnects the call when the call by the user terminal 1 ends (step S24). The session cooperation function unit 13 executes a process for converting the CALL-ID as the SIP session information into an HTTP parameter format (step S25).

In this case, when the telephone function unit 12 receives a response message (200OK) for disconnecting the call from the application server 2 (step S201), the telephone function unit 12 executes a browser start instruction to the session cooperation function unit 13 (step S202).

The browser start instruction from the telephone function unit 12 includes a CALL-ID, and the session cooperation function unit 13 converts the CALL-ID into an HTTP parameter format (step S203) and gives the browser start instruction including the converted CALL-ID to the browsing function unit 11 (step S204).

The browsing function unit 11 applies SIP session information (CALL-ID) to an HTTP message and transmits the HTTP message to the application server 2 (step S205, step S26 of FIG. 8).

Here, a method for applying SIP session information to an HTTP message will be explained. For example, the browsing function unit 11 can apply SIP session information (CALL-ID or the like) as a parameter of an HTTP GET method or as an HTTP extension header.

FIG. 10 illustrates a detailed example. For example, in the example of FIG. 10, it is assumed that the CALL-ID is "440ca9599ba757fbc9a5a0024728 db0e@110.5.1.71".

For example, when a CALL-ID is applied in a GET method, as shown in (A) of FIG. 10, the CALL-ID is converted to "http://www.oki.com/?Call-ID=440ca9599ba757fbc9a5a0024728 db0e@110.5.1.71" before applied. Further, for example, when a CALL-ID is applied to an HTTP extension header, as shown in (B) of FIG. 10, the CALL-ID is converted to "X-Call-ID: 440ca9599ba757fbc9a5a0024728 db0e@110.5.1.71" before applied.

In the application server 2, the HTTP application 21 is activated upon receiving an HTTP GET, generates HTTP session information (Cookie, for example) (step S27), and executes a web application processing (steps S28 and S29).

Here, the HTTP application 21 of the application server 2 extracts the CALL-ID included in the HTTP GET, associates the currently generated cookie information with the CALL-ID, and links with a SIP session based on the CALL-ID.

In the first embodiment, since the number of character strings of the session information depends on each implementation, a SIP parameter or an HTTP parameter may be longer than a range of those specifications. In such a case, a method for shortening the session information to be a proper length with a hash function can be employed.

(A-3) Effects of First Embodiment

As described above, according to the first embodiment, since the user terminal transmits session information of a cooperated application to the application server, the application server is not required to generate or manage an identifier used to link sessions as seen in a related art, and the load of application processing in the server can be reduced.

Further, according to the first embodiment, the cooperated application can be applied regardless of the order of the operations of the web access and telephone call functions.

Further, according to a related method, it is important to register a phone number of a user; however, according to the first embodiment, it is not important to request an extra operation to users.

(B) Second Embodiment

Next, a session sharing system, a session sharing method and a session sharing program according to a second embodiment of the present invention will be explained with reference to the drawings.

In the first embodiment, an embodiment in which a user terminal includes a browsing function unit and a telephone function unit has been described; however, in the second embodiment, an embodiment in which the browsing function unit and the telephone function unit are separately mounted to different user terminals will be described.

(B-1) Configuration of Second Embodiment

Figure 11:
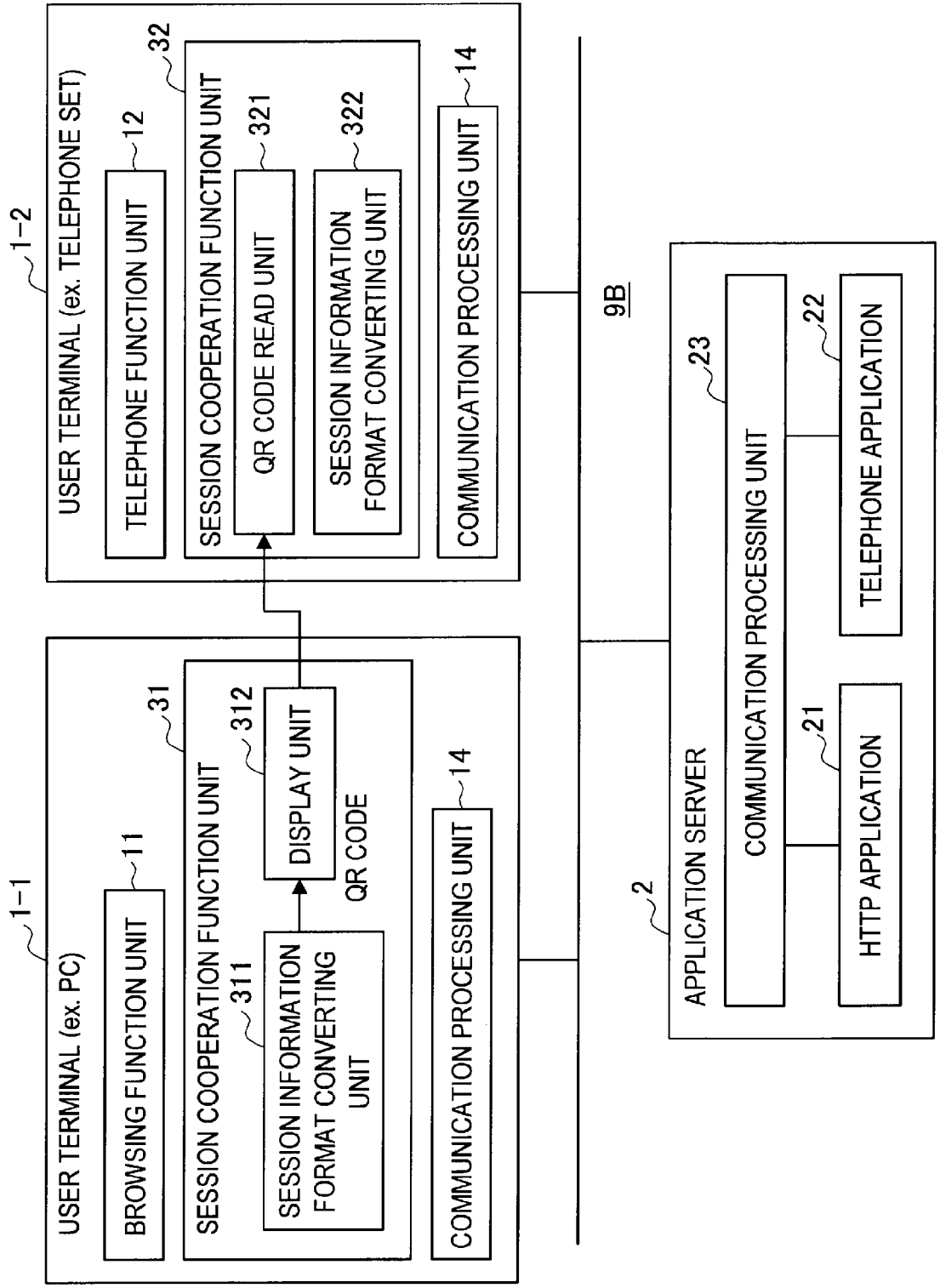
FIG. 11 is a configuration diagram illustrating a session sharing system of a second embodiment.

FIG. 11 is a configuration diagram illustrating a relevant part of a session sharing system of the second embodiment. In FIG. 11, a session sharing system 9B of the second embodiment has a configuration in which user terminals 1-1 and 1-2 are connected to an application server 2 via a network.

The user terminal 1-1 is a personal computer or a portable terminal device such as a PDA. The user terminal 1-1 includes at least a browsing function unit 11, a session cooperation function unit 31 and a communication processing unit 14.

Here, the browsing function unit 11 and communication processing unit 14 are the same processing units described in the first embodiment.

When coordinating the applications, the session cooperation function unit 31 acquires cookie information stored in the browsing function unit 11 and converts the cookie information into a predetermined format.

The session cooperation function unit 31 includes at least a session information format converting unit 311 and a display unit 312 as illustrated in FIG. 11.

Similarly to the first embodiment, the session information format converting unit 311 converts the cookie information from the browsing function unit 11 into a SIP parameter format. Further, the session information format converting unit 311 converts the cookie information in the SIP parameter format into a two-dimensional code. Here, the type of the two-dimensional code is not limited to a specific type and various codes such as a QR code or an SP code can be used. In the second embodiment, a case of a QR code will be described. Here, since a method for converting into a QR code can be a conventional conversion technology, detailed explanation is omitted.

The display unit 312 displays the two-dimensional code of the cookie information converted by the session information format converting unit 311. The display unit 312 is a display of a personal computer for example.

The user terminal 1-2 may be a telephone set (including a fixed-line telephone and a mobile phone), a portable terminal device such as a PDA having a telephone function, for example. The user terminal 1-2 includes at least a telephone function unit 12, a session cooperation function unit 32 and a communication processing unit 14. Here, the telephone function unit 12 and communication processing unit 14 are the same processing units described in the first embodiment.

The session cooperation function unit 32 reads the two-dimensional code displayed on the display unit 312 of the user terminal 1-1, restores the cookie information from the two-dimensional code, and converts the restored cookie information into a SIP parameter format.

The session cooperation function unit 32 includes at least a QR code read unit 321 and a session information format converting unit 322 as illustrated in FIG. 11.

The QR code read unit 321 reads the two-dimensional code displayed on the display unit 312 of the user terminal 1-1.

The session information format converting unit 322 converts the cookie information, which is converted from the two-dimensional code read by the QR code read unit 321 into the SIP parameter format, and gives the converted cookie information to the telephone function unit 12.

In the first embodiment, a case in which the session cooperation function unit 31 of the user terminal 1-1 converts cookie information into a SIP parameter format has been described; however, the session cooperation function unit 31 may convert the cookie information from the browsing function unit 11 directly into a two-dimensional code and the session cooperation function unit 32 of the user terminal 1-2 may convert the cookie information, which is restored from the two-dimensional code, into a SIP parameter format and give the concerted cookie information to the telephone function unit 12.

(B-2) Operation of Second Embodiment

Next, an operation of the session sharing method of the second embodiment will be explained with reference to the drawings. In the second embodiment, it is assumed that the user terminal 1-2 that reads the two-dimensional code initiates a call, and a session cooperation process in a case in which a call is initiated after a web access will be described as an example.

Figure 12:
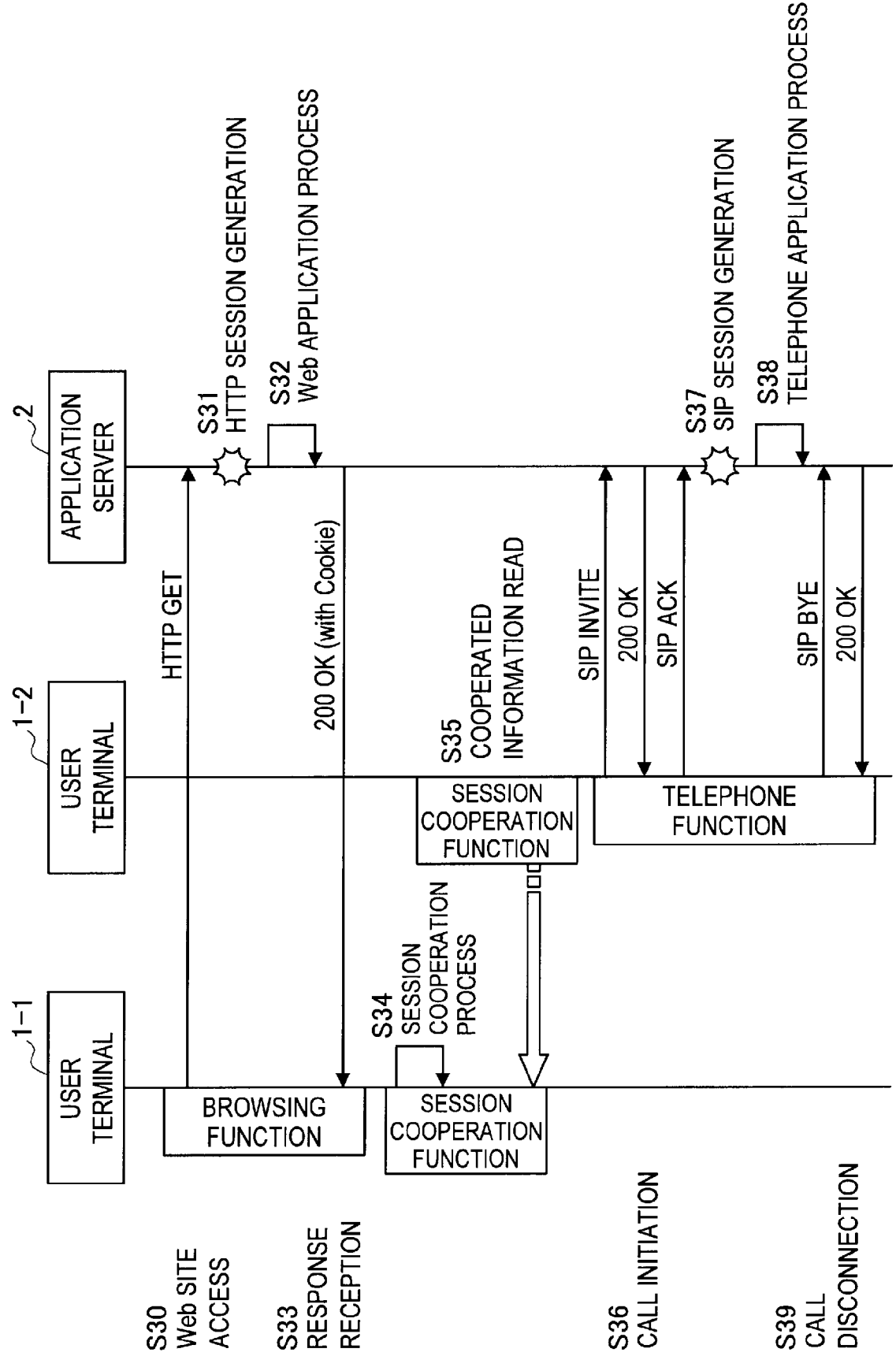
FIG. 12 is a sequence diagram of a session cooperation process in a case of initiating a call after a web access according to the second embodiment.
Figure 13:
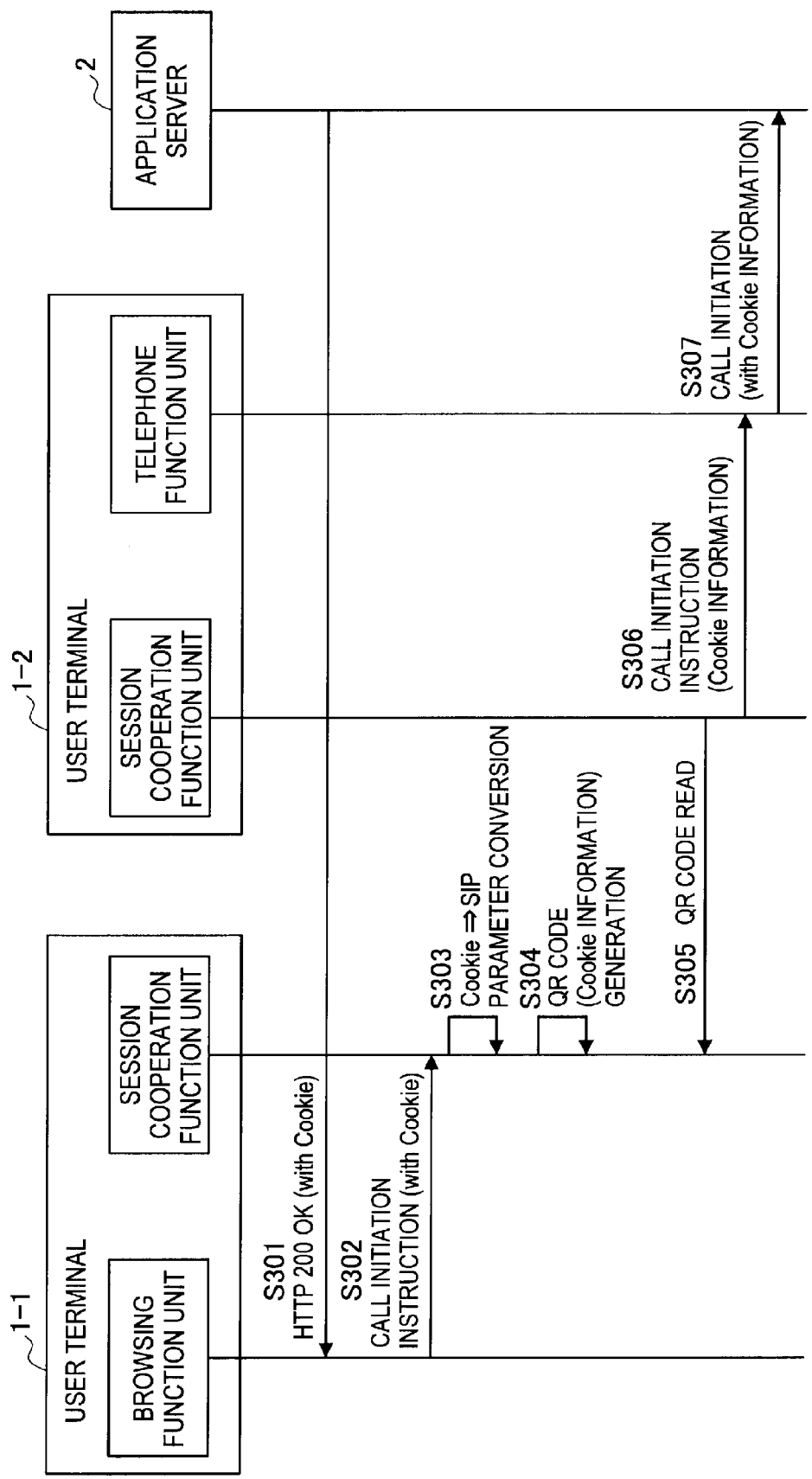
FIG. 13 is a sequence diagram in a user terminal when initiating a call after a web access according to the second embodiment.

FIG. 12 is a sequence diagram illustrating a session cooperation process when a call is initiated after a web access. FIG. 13 is a sequence diagram illustrating session cooperation processes in the user terminal 1-1 and the user terminal 1-2.

Similarly to the first embodiment, to access a predetermined web site, in the user terminal 1-1, the browsing function unit 11 transmits an HTTP GET (step S30), and the application server 2 generates an HTTP session (step S31), executes a web application process, and returns a response message (200OK) including cookie information to the user terminal 1-1 (steps S32 and S33, and step S301 in FIG. 13).

After that, the user uses the user terminal 1-2 to initiate a call that is cooperating with the web service (step S34).

Here, in the user terminal 1-1, the browsing function unit 11 provides the session cooperation function unit 31 with a call initiation instruction including cookie information (step S302).

In the session cooperation function unit 31, the session information format converting unit 311 converts the cookie information into a SIP parameter format (step S303), converts the cookie information in the SIP parameter format into a two-dimensional code (step S304), and displays a two-dimensional code (QR code) on the display unit 312.

The user reads the two-dimensional code displayed on the display unit 312 of the user terminal 1-1 with the QR code read unit 321 of the user terminal 1-2 (steps S35 and S305 in FIG. 12), and the session information format converting unit 322 converts the two-dimensional code into cookie information and gives the cookie information to the telephone function unit 12 (step S306).

Then, as described in the first embodiment, the telephone function unit 12 applies cookie information converted in a SIP parameter format to a SIP INVITE message and transmits the SIP INVITE message to the application server 2 (step S307). The subsequent processes are the same as those in the first embodiment.

(B-3) Effects of Second Embodiment

As described above, according to the second embodiment, in addition to the effects of the first embodiment, session information can be linked even when the browsing function unit and telephone function unit are separately mounted on different terminals.

(C) Third Embodiment

A session sharing system, a session sharing system method, a session sharing system program and a user terminal according to a third embodiment of the present invention will be explained with reference to the drawings.

In the first embodiment, a single application server is used; however, in order to deal with a redundancy or a load distribution for example, an ACT structure in which plural application servers are provided may be used.

Figure 14:
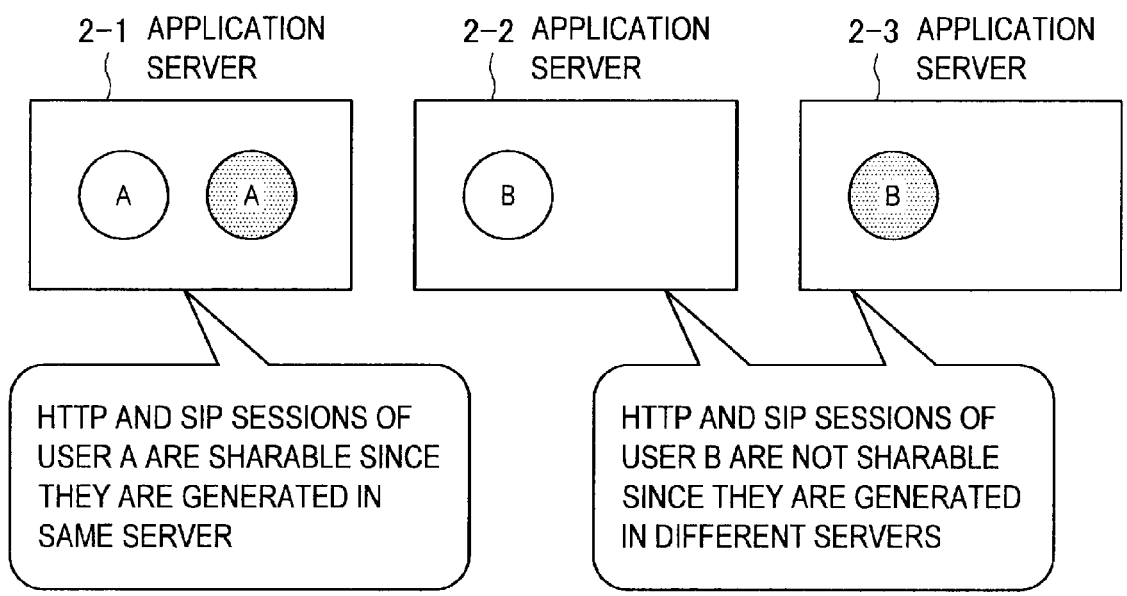
FIG. 14 is an explanatory diagram of an issue related to a separation of HTTP session and SIP session in a configuration including plural application servers.

In such a structure, as illustrated in FIG. 14 for example, when a web request and a call request are received by different servers, SIP and HTTP sessions may be separately performed in different servers. In such a case, when the servers do not have a system for sharing sessions, it is difficult to link the information of the SIP and HTTP sessions.

In this point of view, in the third embodiment, identification information (an IP address or the like, for example) of the application server is provided into session information to be sent back to the user terminal so that network device (a load balancer or the like, for example) can distribute IP and HTTP requests having an address of the same user to a single server.

(C-1) Configuration of Third Embodiment

Figure 15:
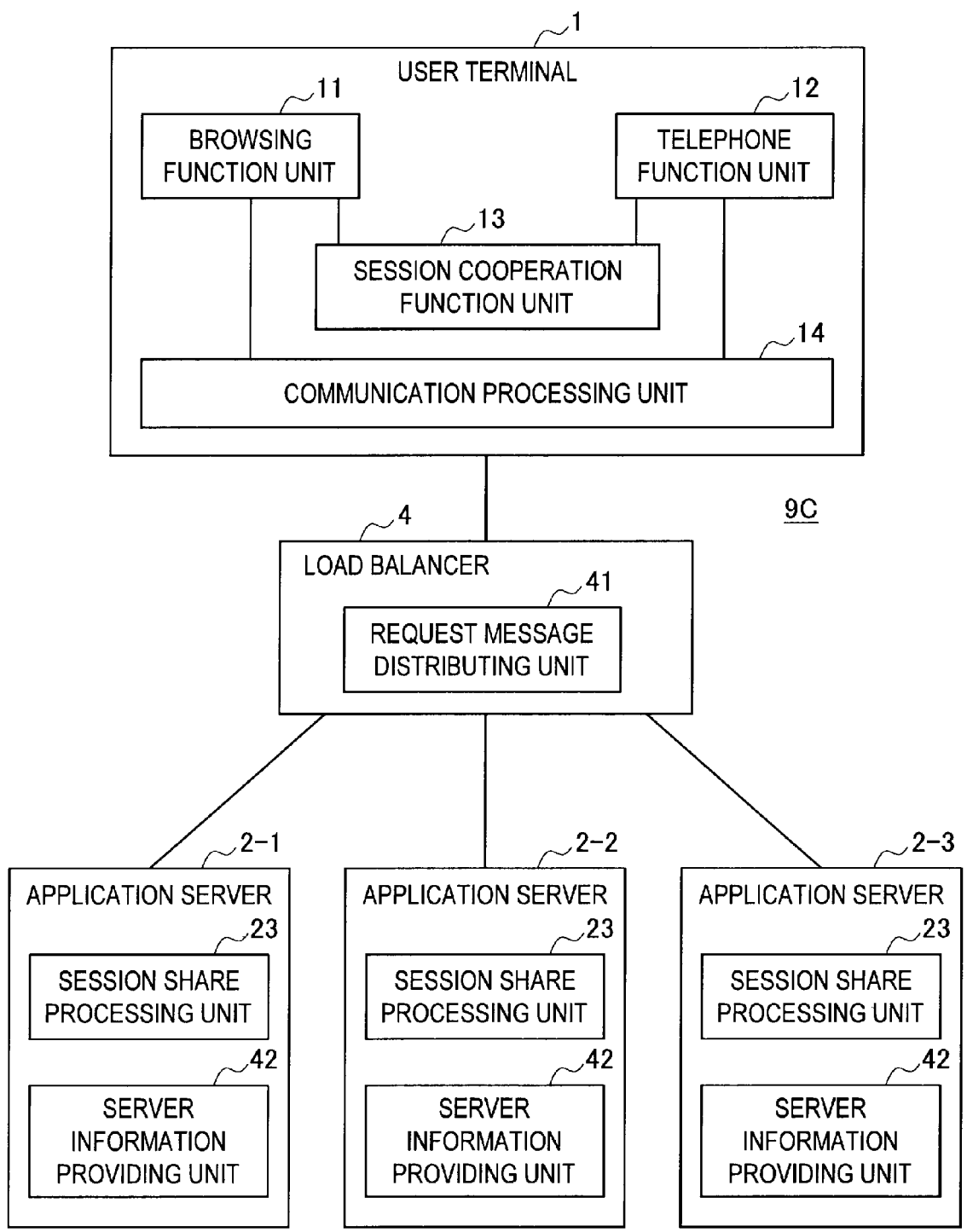
FIG. 15 is a configuration diagram illustrating a session sharing system of a third embodiment.

FIG. 15 is a configuration diagram illustrating a main configuration of a session sharing system of the third embodiment. As illustrated in FIG. 15, in a session sharing system 9C of the third embodiment, a user terminal 1 is connected to application servers 2-1 to 2-3 via a load balancer 4.

The load balancer 4 is a load distribution device that distributes packets received from the user terminal 1 to the application servers 2-1 to 2-3. The load balancer 4 includes a request message distributing unit 41 as illustrated in FIG. 15 in addition to functions of a typical load balancer.

The request message distributing unit 41 distributes a request message to one of the application servers 2-1 to 2-3 based on the request message received from the user terminal 1.

Figure 16:
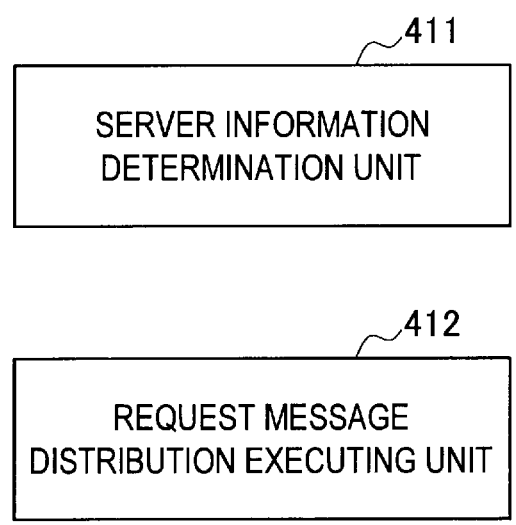
FIG. 16 is a block diagram illustrating a functional configuration of a request message distributing unit of a load balancer according to the third embodiment.

FIG. 16 is a block diagram illustrating a functional configuration of the request message distributing unit 41. The request message distributing unit 41 includes at least a server information determination unit 411 and a request message distribution executing unit 412.

The server information determination unit 411 determines a destination of the request message based on server information included in the request message received from the user terminal 1. Here, the server information may be an IP address or the like of the application servers 2-1 to 2-3 for example.

The request message distribution executing unit 412 distributes the request message according to a determination result by the server information determination unit 411.

The application servers 2-1 to 2-3 are the same as the application server explained in the first embodiment and the load balancer 4 executes a load distribution of the application servers 2-1 to 2-3. Since HTTP session and SIP session may be separately processed in different application servers, the respective application servers 2-1 to 2-3 of the third embodiment include a server information providing unit 42 to avoid such an issue.

The server information providing unit 42 applies its server information to a response message to be sent back to the user terminal 1. More specifically, the application servers 2-1 to 2-3 apply session information and server information to a response message before transmitting the response message.

(C-2) Operation of Third Embodiment

Next, an operation of the session share process of the third embodiment will be explained with reference to the drawings. Hereinafter, a process for initiating a call after a web access will be described as an example; however, the same process can be applied to execute a web access after initiating a call.

FIG. 17 is a sequence diagram illustrating a session cooperation process when a call is initiated after a web access.

Firstly, similarly to the first embodiment, in the user terminal 1, the browsing function unit 11 transmits an HTTP GET to access a web site (step S41). In this case, a destination of the HTTP GET is a virtual node address of the load balancer 4 for example.

Upon receiving the HTTP GET, the load balancer 4 executes a predetermined process such as a load distribution and transmits the HTTP GET to an appropriate application server. Here, a case of transmitting the HTTP GET to the application server 2-2 will be described as an example.

The application server 2-2 generates an HTTP session (cookie information) (step S42) and executes a web application process (step S43). Further, in the application server 2-2, the server information providing unit 42 applies its server information to a response message before transmitting to the user terminal 1 (step S44).

Upon receiving the response message (step S45), in the user terminal 1, similarly to the first embodiment, a session cooperation process is executed (step S47) and the telephone function unit 12 applies cookie information converted in a SIP parameter format and the server information of the application server 2-2 to a SIP INVITE message and the SIP INVITE message is transmitted to the load balancer 4 (step S47).

Upon receiving the SIP INVITE message from the user terminal 1, in the load balancer 4, the server information determination unit 411 determines that the request message is addressed for the application server 2-2 based on the server information included in the SIP INVITE message and the request message distribution executing unit 412 transmits the SIP INVITE message to the application server 2-2 (step S48).

With this configuration, the SIP INVITE message including the HTTP session information (cookie information) can be given to the application server 2-2, which provides a phone application cooperating with the web service so that the HTTP session and SIP session can be linked Note that the subsequent processes are the same as those in the first embodiment, so those explanations are omitted here.

(C-3) Effects of Third Embodiment

As described above, according to the third embodiment, in addition to the effects of the first embodiment, plural application servers can be provided in an ACT structure even when the servers do not have a system to share sessions among the servers.

(D) Other Embodiments

In the first to third embodiments, a case in which SIP is used as a communication protocol for a call control has been described; however, the communication protocol is not limited to SIP and ITU-T Recommendation H.323 or MGCP (Media Gateway Control Protocol) or the like can be used for example.

In the second embodiment, a two-dimensional code such as a QR code is used as a method for giving and receiving session information between user terminals; however, the present invention is not limited to this and a one-dimensional code may be used. In such a case, it is important that the user terminal includes a means for reading one-dimensional codes. Further, for example, session information can be giving and receiving between the user terminals by using a USB connection or the like.

In the third embodiment, a case in which plural application servers are provided based on the configuration of the first embodiment has been described; however, the same configuration can be used in the second embodiment.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-220790 filed in the Japan Patent Office on Sep. 25, 2009, the entire content of which is hereby incorporated by reference.

What is claimed is:

1. A session sharing system for sharing sessions in a system in which at least one application server cooperates for plural applications, comprising:
   a first function processor for receiving a first application service from the at least one application server by a first communication processing protocol;
   a second function processor for receiving a second application service from the at least one application server by a second communication processing protocol; and
   sharing means for permitting a session between a user terminal and the at least one application server to share the first and second application services, the sharing means including a session information cooperation unit for converting session information of the session, which is acquired from the first function processor or the second function processor, into a predetermined format and giving the converted session information to the second function processor or the first function processor,
   wherein the second function processor or the first function processor transmits, to the at least one application server, a request message including the converted session information received from the session information cooperation unit,
   wherein the at least one application server associates the converted session information included in the request message with session information that is generated based on a current communication processing protocol,
   wherein the first and second function processors and the sharing means are included in the user terminal,
   wherein the first communication processing protocol is HTTP and the second communication processing protocol is SIP, and
   wherein the session information of an HTTP session is converted into a predetermined SIP parameter format.

2. The session sharing system according to claim 1, wherein the session information cooperation unit converts session information of a session previously established with the at least one application server into a communication protocol format used in the current communication.

3. The session sharing system according to claim 1, wherein each at least one application server includes:
   a server information providing unit configured to transmit information containing established session information and server identification information thereof to a user terminal; and
   a message distributing unit for receiving a request message including the session information and the server identification information transmitted from the second function processor or the first function processor and distributing the request message based on the server identification information.

4. A session sharing method for sharing sessions in a system in which at least one application server cooperates for plural applications, comprising the steps of:
   receiving a first application service from the at least one application server by a first communication processing protocol, by a first function processor;
   receiving a second application service from the at least one application server by a second communication processing protocol, by a second function processor;
   permitting a session between a user terminal and the at least one application server to share the first and second application services, the permitting step including converting session information of the session, acquired from the first function processor or the second function processor, into a predetermined format and giving the converted session information to the second function processor or the first function processor, by a session information cooperation unit;

transmitting a request message including the converted session information from the session information cooperation unit to the at least one application server, by the second function processor or the first function processor; and associating the converted session information included in the request message with session information generated by a current communication processing protocol, by the at least one application server, wherein the first and second function processors and the session information cooperation unit are included in the user terminal, wherein the first communication processing protocol is HTTP and the second communication processing protocol is SIP, and wherein the session information of an HTTP session is converted into a predetermined SIP parameter format.

5. A non-transitory computer-readable medium that stores a session sharing program for a user terminal in a session sharing system in which at least one application server shares sessions and cooperates for plural applications, the program when executed causing the user terminal to function as:

a first function processor for receiving a first application service from the at least one application server by a first communication processing protocol;

a second function processor for receiving a second application service from the at least one application server by a second communication processing protocol; and sharing means for permitting a session between a user terminal and the at least one application server to share the first and second application services, the sharing means including a session information cooperation unit for converting session information of the session, which is acquired from the first function processor or the second function processor, into a predetermined format and giving the converted session information to the second function processor or the first function processor, wherein the second function processor or the first function processor transmits a request message including the converted session information received from the session information cooperation unit to the at least one application server, wherein the first communication processing protocol is HTTP and the second communication processing protocol is SIP, and wherein the session information of an HTTP session is converted into a predetermined SIP parameter format.

6. A user terminal configured in a session sharing system in which at least one application server shares sessions and cooperates for plural applications, the user terminal comprising:

a first function processor for receiving a first application service from the at least one application server by a first communication processing protocol;

a second function processor for receiving a second application service from the at least one application server by a second communication processing protocol; and sharing means for permitting a session between a user terminal and the at least one application server to share the first and second application services, the sharing means including a session information cooperation unit for converting session information of the session, acquired from the first function processor or the second function processor, into a predetermined format and giving the converted session information to the second function processor or the first function processor, wherein the second function processor or the first function processor transmits, to the at least one application server, a request message including the converted session information received from the session information cooperation unit, wherein the first and second function processors and the sharing means are included in the user terminal, wherein the first communication processing protocol is HTTP and the second communication processing protocol is SIP, and wherein the session information of an HTTP session is converted into a predetermined SIP parameter format.

* * * * *